March 5, 1940.   F. M. GREEN   2,192,307
CARTON
Filed June 6, 1938
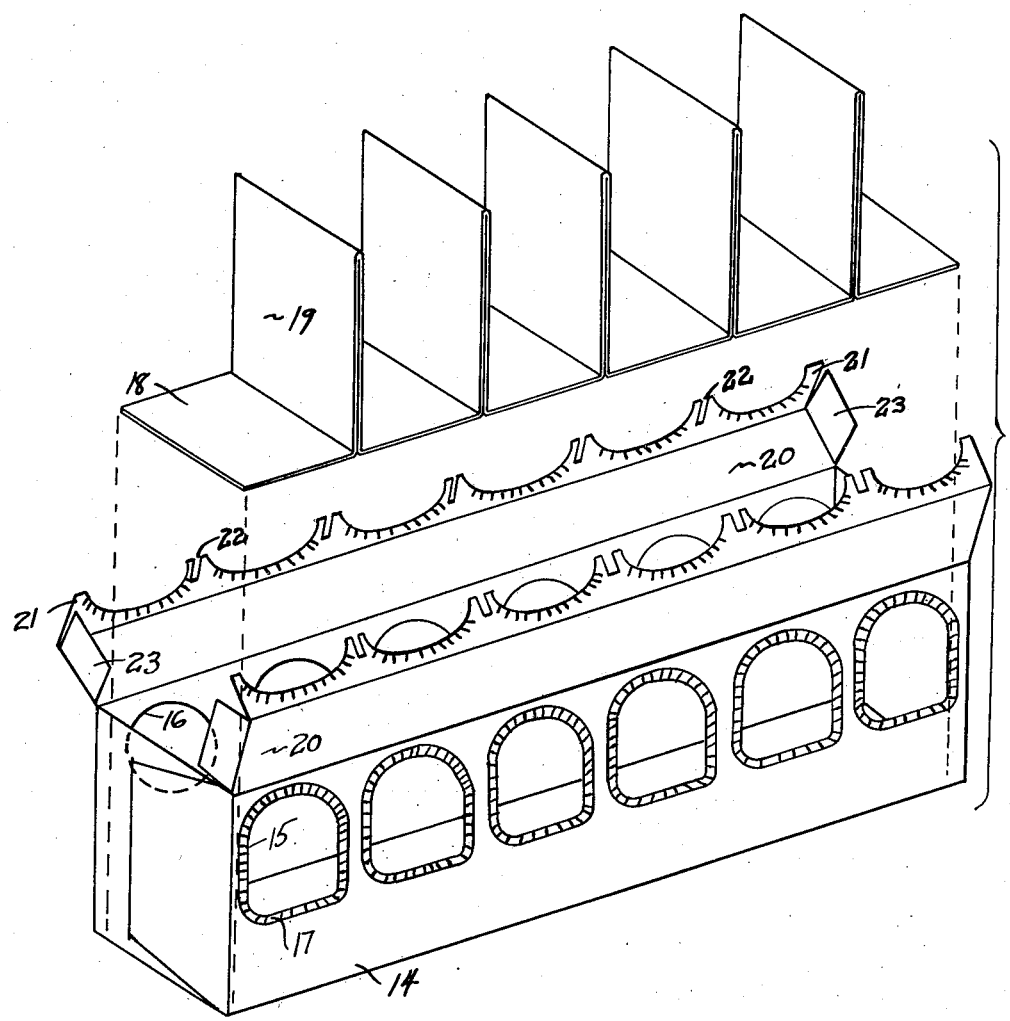
Frank M. Green
INVENTOR.
BY W. B. Harpman
ATTORNEY Patented Mar. 5, 1940

2,192,307

UNITED STATES PATENT OFFICE 2,192,307

CARTON

Frank M. Green, Andover, Ohio

Application June 6, 1938, Serial No. 212,213

1 Claim. (Cl. 229—29)

This invention relates to an egg carton.

The principal object of this invention is the provision of a carton adapted to contain and protect a plurality of eggs and at the same time provide means of effectively holding each of the said eggs so that practically each entire egg can be seen through its side and its contents and condition are therefore readily visible when the carton is placed in front of a suitable light source.

A still further object of this invention is the provision of an egg carton having openings in its sides so as to permit eggs therein to be candled without removing them from the said carton, the carton being of sufficient strength to contain and protect the eggs therein when the cartons are piled one upon the other.

The carton shown and described herein has been designed so as to provide for the candling of eggs therein through their sides, thus making practically each entire egg visible at the same time and disclosing the position and color of the yolk as well as any blood clots or other imperfections in the egg and any cracks in the shell that will allow air to enter the egg and result in mold. The size and position of the air cell is also readily visible when the egg is viewed from the side, thus allowing for the determination of the degree of freshness of the eggs.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein the drawing is a perspective view of the egg carton showing in detail the openings provided in the sides thereof for the candling of the eggs therein.

In the drawing a carton particularly adapted for use in candling eggs is shown, and comprises a rectangular box 14 having a plurality of egg viewing openings 15 provided in one side thereof and a matching plurality of light admitting openings 16 positioned in the opposite side thereof. Each of the plurality of egg viewing openings 15 is provided with an inturned flange 17 formed of the pump material of the carton and adapted to fit itself tightly against the side of the egg and thus provide a suitable candling frame.

It is obvious that the exact shape of these egg viewing openings need conform only roughly with the shape of the side of the egg as the inturned flanges 17 are formed with a soft pulpy edge which readily adapts itself to the exact shape of the egg. At the same time these openings 15 are sufficiently smaller than the actual egg size so as to provide sufficient structural protection around and about the egg. It will be seen that the shape and size of the egg viewing openings 15 is sufficient to permit practically the entire egg to be viewed when the carton is positioned in front of a light source.

In order that the egg carton may be structurally strong enough to protect the eggs therein during normal handling and shipping a spacer member 18 is adapted for and intended to be placed in the carton in such manner that the upright portions 19 thereof form suitable spacing means and provide the necessary vertical structure of the carton so that the cartons may be piled one upon the other without any egg breakage. This spacer 18 is preferably formed of a continuous length of cardboard or other suitable material the vertical sections thereof thus being doubled. This insures sufficient strength. In order that the vertical sections 19 of the spacer 18 may be kept in a vertical position, the top portions 20 of the rectangular box 14 are provided with downturned flanges 21 and notches 22 adapted to fit over the upper edges of the vertical portions 19 of the spacer 18. These downturned flanges 21 are also provided with a relatively thin edge shaped so as to conform with the upper portions of the eggs thus insuring the egg's proper positioning within the carton.

It will be seen that when the top portion 20 of the rectangular box 14 have been closed, end flanges 23 help to hold these top portions in proper position, and that the resulting carton provides an efficient means of packaging eggs and at the same time provides for the candling thereof, each egg being viewed from the side.

When these cartons are used in connection with any suitable egg candling device it will be readily apparent that a practical and efficient means is provided for the inspection of the eggs in the carton, and will at all times allow the perspective customer to personally determine the quality of the eggs offered for sale.

What I claim is:

An egg carton formed of two pieces of suitable material and comprising a rectangular box; top portions for said box; flanged edges on the said top portions; a plurality of egg fitting cutouts along the said flanged portions so as to adapt the same to fit the tops of eggs placed in the said box; a plurality of oppositely disposed openings formed in the sides of the said box; inturned flanges formed on the said openings of sufficient size to snugly fit the opposite sides of eggs placed in the said box and hold the same in position for candling thru their sides, together with a plurality of vertical spacer portions formed of a single piece of material and positioned in the said box between each of the said eggs.

FRANK M. GREEN.